No. 856,510.

PATENTED JUNE 11, 1907.

G. W. BELL.
PNEUMATIC VEHICLE SPRING.
APPLICATION FILED JUNE 22, 1906.

2 SHEETS—SHEET 1.

WITNESSES:

INVENTOR
George William Bell
BY
ATTORNEYS.

No. 856,510. PATENTED JUNE 11, 1907.
G. W. BELL.
PNEUMATIC VEHICLE SPRING.
APPLICATION FILED JUNE 22, 1906.

2 SHEETS—SHEET 2.

WITNESSES: INVENTOR.
George William Bell
BY
ATTORNEYS.

UNITED STATES PATENT OFFICE.

GEORGE WILLIAM BELL, OF LIVERPOOL, ENGLAND.

PNEUMATIC VEHICLE-SPRING.

No. 856,510.      Specification of Letters Patent.      Patented June 11, 1907.

Application filed June 22, 1906. Serial No. 322,810.

*To all whom it may concern:*

Be it known that I, GEORGE WILLIAM BELL, a subject of the King of Great Britain and Ireland, residing at Liverpool, in the county of Lancaster, England, have invented certain new and useful Improvements in Pneumatic Vehicle-Springs, of which the following is a specification, reference being had therein to the accompanying drawings.

This invention refers more particularly to a pneumatic vehicle spring of the character applied to the hub of a wheel whereby the air spring is interposed between the hub thereof and the supporting axle. Wheels of this character have been constructed with an inner and outer hub, the outer hub forming a part of the wheel and revolving with it while the inner hub remains stationary and is supported on the axle by a cushion of compressed air confined in a chamber formed between a cylinder and a piston.

Figure 1:
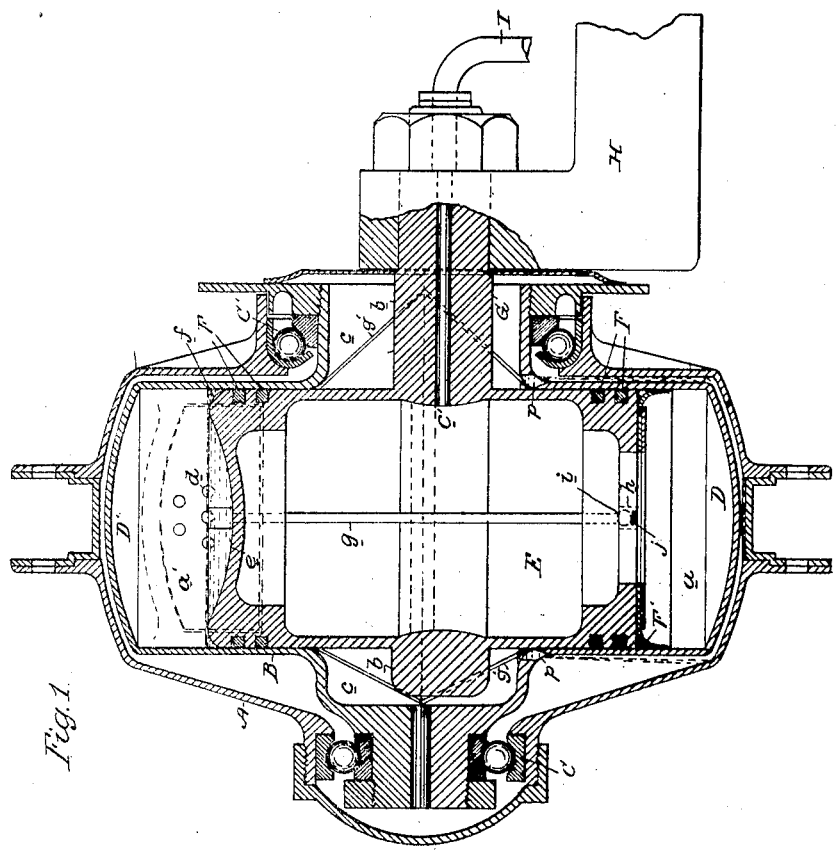
Figure 2:
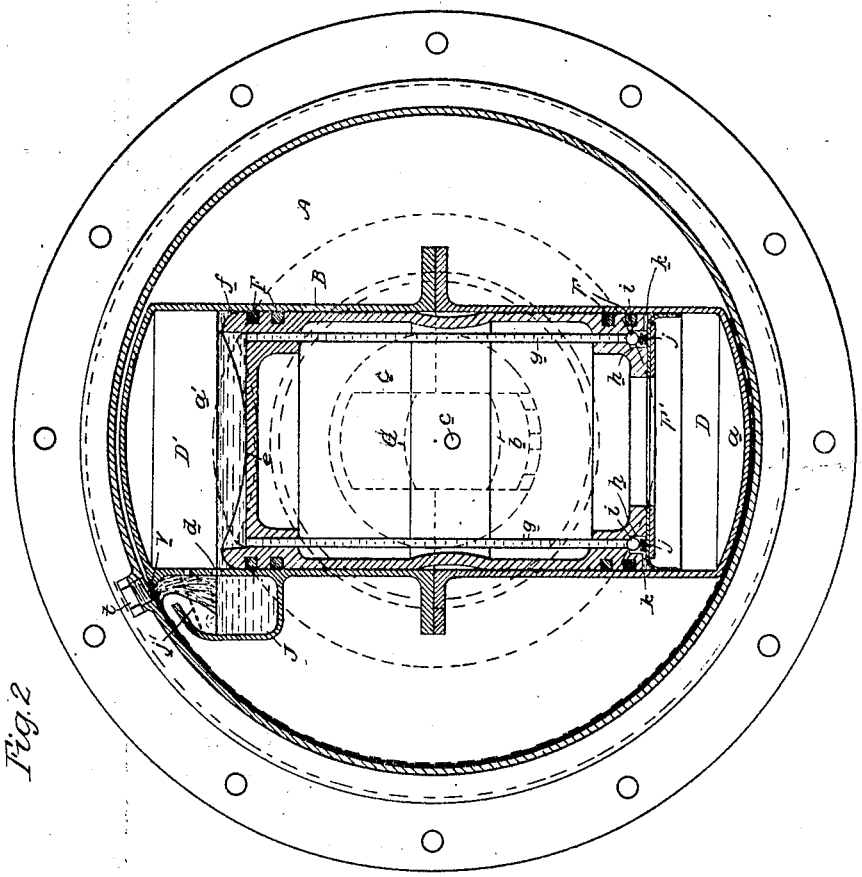

The difficulty in the use of air springs arises from the constant leakage of the air when thus confined and my invention has for its object to greatly reduce if not entirely suppress the same and to this end my invention consists in the peculiar and novel application of a viscous fluid to the cylinder and piston of the air spring and also incidentally to obtain lubrication of the parts, all as more fully hereinafter described and shown in the accompanying drawings, in which Figure 1, is a vertical central section through a vehicle wheel provided with an air spring embodying my invention; Fig. 2, is a cross section thereof in a plane at right angles to that in Fig. 1.

Referring to the drawings, A is the hollow outer hub revolving with and forming a part of the vehicle wheel. B is the inner hub around which the outer hub revolves. C and C' are ball bearings interposed between the inner and outer hubs. D D' are cylinders cast within the inner hub. E is a piston engaging with its opposite ends into the cylinders D D' respectively and forming therein the air chambers $a$ $a'$. F are piston rings on the ends of the piston. F' is a cup leather on the lower end of the piston. G is a stub axle forming a rigid part of the piston and provided with the squared portion $b$ engaging into vertical guide bearings $c$ formed in the inner hub and vertically guiding the inner hub upon the stub axle. H is the supporting axle of the vehicle to which the stub axle is suitably secured and I is a pipe connecting a source of compressed air (not shown) through a passage $c'$ with the interior of the piston which communicates with the air chamber $a$ and thereby forms the air spring which supports the load upon the wheel, all as more specifically described in a patent of mine dated Oct. 23, 1906, No. 833,912.

In practice it has been found that the lower end of the piston cannot be maintained air tight in the cylinder without the use of a viscous oil or lubricant but since the air in the chamber $a$ will be normally under considerable pressure the air will gradually drive the oil upwardly past the leather cup and piston rings and the oil ultimately finds its way out through the open guide bearings $c$ in the inner end of the stub axle. If this oil is not replaced at frequent intervals, it becomes difficult to maintain the air in the cylinder D without considerable leakage and consequent loss of pressure. To provide against this, the following construction is applied. On the upper cylinder D' at the back thereof is an oil reservoir J covering part of the cylinder wall and communicating with the interior through ports $d$. As the upper cylinder operates as a dash pot, air will be forced out or drawn in through these ports and consequently at each recoil when air is drawn in oil will be drawn in with it, ordinarily through the lower ports but in event of the reservoir being full of oil all may allow both air and oil to pass in. The upper end of the piston is provided with a dished or cup top $e$ and beveled or rounded off on its periphery to form a channel $f$ all around. In the bottom of dish or cup $e$ there is provided one or more small pipes $g$ which communicate with the lower end or face of this piston on which the cup leather is carried. An enlargement $h$ is formed at the end of the pipe containing a small ball or check $i$ which is maintained in its upper position by a coil spring $j$. From this enlargement a small side passage $k$ provides for the direct passage of oil to the back of the cup leather and the wall of the lower cylinder.

In operation, assuming that the piston is on a downward move in the cylinders the air in the lower cylinder has its pressure raised while simultaneously air and oil will be drawn into the upper cylinder until the cup $e$ and pipes $g$ are filled with oil, and also the channel $f$. The oil in the cup $e$ and pipes $g$ will be held by the check valve $i$ until the piston reverses its movement when any excess of oil lying on the top of piston more than what is held in the cup $e$ and channel $f$ will be expelled into the oil reservoir together with air that is being displaced by the piston. As the piston, however, closes the ports $d$ it cuts off the egress of air and causes same to rise in pressure and in so doing perform the desired function of a dash pot in arresting excessive upward motion and at the same time acts on the surface of the oil causing the same to be forced through the pipes $g$ past check valves $i$ through passages $k$ to the periphery of the piston and lubricate the same. The pressure on the oil being less than that in the lower cylinder, no oil is forced past the leather into the same and the oil is therefore compelled to pass slowly up between the piston and cylinder and form by its viscosity and pressure an excellent packing for maintaining the piston air tight, and at the same time keep the parts thoroughly lubricated. The oil forced up between the piston and lower cylinder oozes out into the guide bearings in which the stub axle works. Its escape from these however is prevented by means of holes $p$ bored through the lower part of said guide bearings, and conducting the oil along the outside of the lower cylinder into the bottom of the outer hub, there are also grooves $g'$ formed in the side walls of these bearings to lubricate the same which grooves also lead into these holes and assist in conducting the oil into them. In the travel of the wheel the oil thus collected in the outer hub will by centrifugal action be carried up adhering to the inner surface in the central portion which is of greater radius and by providing the inner hub with a suitable brush or knife edged projection $v$ just above the oil reservoir the oil is thrown back again into the reservoir, thus completing the circulation of the oil.

The reservoir is provided with a suitable filter $j'$ to collect all impurities and a suitable filling hole closed by a plug $t$ is provided in the outer hub to give access to the reservoir for filling it with oil although it is obvious that the oil may be filled into the outer hub.

My invention applies to all the wheels of a vehicle and when thus equipped the air springs are maintained intact for a considerable period of time and with proper facilities for supplying compressed air when needed from a reservoir carried on the vehicle the wheels will require less attention than pneumatically tired wheels while at the same time a most effective system of lubrication is provided preventing wear and tear of the parts. It will be understood that the channel $f$ has the function of keeping the upper end of the piston lubricated, oil from said channel being forced down around the piston and what is oozing out at the guide bearings will be conducted with the assistance of the oil grooves $g'$ into the holes $p$.

If the cup leather which is carried by the lower piston is omitted, I preferably conduct the oil from the lower end of the pipes $g$ through suitable channels to the grooves in the piston which hold the lower packing rings, but if desired it may be conducted to any other part of the face of the piston, preferably into a groove or channel thereof. The small check valve $i$ may be dispensed with in some instances, its use prevents any leakage of air from the lower piston chamber into the upper piston chamber which operates as the dash pot.

The ball races are also kept efficiently lubricated by the oil that runs down along the side walls of the outer hub.

My invention is broadly applicable in part or in whole to other forms of pneumatic springs of the piston and cylinder type in which air chambers are formed above and below the piston, one of which is adapted to support the load while the other forms a check spring and my invention broadly includes means whereby the working of the pneumatic spring itself maintains an oil packing upon the part of the piston which confines the air of the load supporting spring in one end of the cylinder.

Having thus fully described my invention, what I claim is:—

1. The combination with the piston and cylinder of a pneumatic vehicle spring having air chambers above and below the piston one of which is provided with means for supplying it with compressed air and forms the load supporting spring and the other one forms a check spring therefor, of an oil packing formed between the working faces of the piston and cylinder and means for automatically supplying it with oil under pressure by the operation of the spring.

2. The combination with the piston and cylinder of a pneumatic vehicle spring having air chambers above and below the piston, one adapted to form the supporting spring for the load and the other operating as a check spring, the combination of an oil reservoir in which the oil is subjected to the variations of pressure in the chamber forming the check spring and an oil duct leading from said chamber to the part of the piston working in the other chamber and adapted to lubricate the same.

3. The combination with the cylinder and piston of a pneumatic vehicle spring having air chambers above and below the piston one adapted to form the supporting spring and the other operating as a check spring, the combination of an oil reservoir within the air chamber forming the check spring and subjected to the variation of pressure therein and an oil duct leading therefrom to the part of the piston working in the other chamber and adapted to lubricate the same.

4. The combination with the piston and cylinder of a pneumatic vehicle spring having air chambers above and below the piston one adapted to form the supporting spring for the load and the other to form a check spring, the combination of an oil reservoir subjected to the varying pressures of the air in the chamber forming the check spring, an oil duct leading therefrom to the part of the piston working in the other chamber and adapted to lubricate the same and a check valve in said conduit.

5. The combination with the piston and cylinder of a pneumatic vehicle spring having an air chamber below the piston forming the load supporting spring and an air chamber above the piston forming a check spring for the same, the combination of an oil reservoir in the last mentioned chamber and exposed to the varying pressure of air in said chamber and an oil duct leading therefrom to the part of the piston working in the other chamber and adapted to lubricate the same.

6. The combination with the piston and cylinder of a pneumatic vehicle spring having an air chamber below the piston forming the load supporting spring and an air chamber above the piston forming a check spring therefor, the combination of an oil reservoir formed on the upper end of the piston, an oil duct in the piston leading from the bottom of the oil reservoir to the lower end of the piston and adapted to deliver the oil to the part of the piston working in the lower air chamber and means whereby the oil forms a packing for the same.

7. The combination with the piston and cylinder of a pneumatic vehicle spring having upper and lower air chambers, the lower one of which forms the load supporting spring and the upper one of which forms a check spring, of an oil reservoir on the upper end of the piston, an oil duct leading therefrom to the lower end of the piston, a cup leather at the lower end of the piston behind which said oil duct discharges, and an oil supply reservoir on the outer wall of the cylinder adjacent to the oil reservoir on the upper end of the piston and communicating therewith through holes in the walls of the cylinder.

8. The combination with the piston and cylinder of a pneumatic vehicle spring in which the piston works between two air chambers the lower one of which forms the load supporting spring and the upper one of which forms a check spring, of an oil reservoir formed at the top of the piston, an oil duct leading therefrom to the lower end of the piston, said lower end provided with a cup leather forming an annular groove around the piston into which the oil is discharged from said oil duct and a check valve in said oil duct.

9. The combination with the piston and cylinder of a pneumatic vehicle spring in which the piston works between two air chambers, the lower one of which is adapted to support the load and the upper one of which forms a check spring, of an oil reservoir carried on the upper end of the cylinder and communicating with the air chamber above the piston through holes in the wall of the cylinder, the upper end of the piston being centrally recessed and peripherally beveled to form oil pockets adapted to receive oil from the aforesaid oil reservoir and an oil duct leading from the bottom of the recessed portion to the part of the piston working in the lower chamber.

10. The combination with the cylinder and piston of a pneumatic vehicle spring, of an axle carrying the piston and passing through openings in the wall of the cylinder, a cup leather secured to one end of the piston and forming an annular channel around the piston at the base of the cup leather, means for forcing oil under pressure into said channel by the operation of the spring and a piston ring above the cup leather adapted to retard the flow of the oil past the piston.

11. The combination with the cylinder and piston of a pneumatic vehicle spring, of an axle carrying the piston and passing through an opening in the wall of the cylinder, the piston extending above and below it, self contained means for lubricating the parts of the piston working in the opposite ends of the cylinder, a wheel having a hollow hub inclosing the pneumatic spring and revolving around it and means for collecting the oil which is forced past the piston in the hub of said wheel.

12. The combination with the cylinder and piston of a pneumatic vehicle spring interposed between the axle and a vehicle wheel, the wheel having a hollow hub wholly inclosing the pneumatic spring and revolving around it, of self contained means in the pneumatic spring for lubricating the parts of the piston working in opposite ends of the cylinder, means for collecting the oil which passes the piston in the hub of the wheel and means operated by the movement of the wheel for returning the oil to the pneumatic spring.

In testimony whereof I affix my signature in presence of two witnesses.

GEORGE WILLIAM BELL.

Witnesses:
   OTTO F. BARTHEL,
   CHAS. B. SHUMWAY